(12) United States Patent
Mazzocco et al.

(10) Patent No.: US 10,137,564 B2
(45) Date of Patent: Nov. 27, 2018

(54) HANDLE FOR A TOOL OR LIKE IMPLEMENT

(71) Applicant: The MazzTech Group, LLC, King George, VA (US)

(72) Inventors: Michael Jared Mazzocco, King George, VA (US); Jan-Eirik Beckerman, Edgewater, MD (US); Raymong Patrick Michaels, Harvest, AL (US)

(73) Assignee: THE MAZZTECH GROUP, LLC, King George, VA (US)

( * ) Notice: Subject to any disclaimer, the term of this patent is extended or adjusted under 35 U.S.C. 154(b) by 125 days.

(21) Appl. No.: 15/304,426

(22) PCT Filed: Apr. 15, 2015

(86) PCT No.: PCT/US2015/025965
§ 371 (c)(1),
(2) Date: Oct. 14, 2016

(87) PCT Pub. No.: WO2015/160947
PCT Pub. Date: Oct. 22, 2015

(65) Prior Publication Data
US 2017/0043473 A1    Feb. 16, 2017

Related U.S. Application Data

(60) Provisional application No. 61/981,486, filed on Apr. 18, 2014.

(51) Int. Cl.
*B25G 1/04*    (2006.01)
*B25G 1/10*    (2006.01)
(Continued)

(52) U.S. Cl.
CPC ............... *B25G 1/04* (2013.01); *B25G 1/102* (2013.01); *A01B 1/00* (2013.01); *A01D 7/00* (2013.01); *A46B 9/02* (2013.01)

(58) Field of Classification Search
CPC .. A01B 1/00; A01B 1/02; A01B 1/022; A01B 1/028; A01D 7/00; A01D 7/10;
(Continued)

(56) References Cited

U.S. PATENT DOCUMENTS 1,182,139 A    5/1916   Brown
1,309,599 A *  7/1919   Seaboldt ............ A46B 15/0055
                                                    15/111
(Continued)

OTHER PUBLICATIONS

International Search Report for PCT/US2015/025965, dated Aug. 6, 2015, 2 pages.
(Continued)

*Primary Examiner* — David B Thomas
(74) *Attorney, Agent, or Firm* — Cafardi, Ferguson, Wyrick, Weis + Stotler LLC; Andrew M. Gabriel

(57) ABSTRACT

An embodiment relates to a tool, including: a handle having an interior cavity therein; a grip on the handle; a rod that is movable with respect to the interior cavity of the handle such that movements of grip are translated into movements of the rod to deploy and retract an end of the rod with respect to an end of the handle; and a tool element attached to the handle. Other embodiments are described and claimed.

7 Claims, 9 Drawing Sheets

(51) Int. Cl.
*A01B 1/00* (2006.01)
*A01D 7/00* (2006.01)
*A46B 9/02* (2006.01)

(58) Field of Classification Search
CPC . A46B 9/02; A61F 2/4611; B25D 1/16; B25F 5/025; B25G 1/04; B25G 1/102
USPC .............. 248/685, 688; 294/219; 56/400.13, 56/400.14
See application file for complete search history.

(56) References Cited

U.S. PATENT DOCUMENTS

| | | | | |
|---|---|---|---|---|
| 1,722,545 A * | 7/1929 | Wackwitz | ............... | A46B 17/08 248/685 |
| 2,016,263 A * | 10/1935 | Beythan | ................... | A01D 7/10 294/50 |
| 2,060,366 A * | 11/1936 | Dunlap | ................ | A01K 15/003 119/806 |
| 3,666,311 A * | 5/1972 | McMullin | ................... | B25J 1/04 29/750 |
| 3,733,636 A * | 5/1973 | Osadsky | ................... | A01B 1/18 15/111 |
| 4,070,932 A * | 1/1978 | Jeannotte | ............... | B25G 1/043 16/429 |
| 4,183,570 A * | 1/1980 | Broyles | ..................... | E01H 1/12 294/61 |
| 4,674,747 A * | 6/1987 | Mazzocco | ............... | A63B 53/10 206/315.5 |
| 4,944,081 A * | 7/1990 | Ross | ................... | B25B 27/0028 29/235 |
| 4,954,025 A * | 9/1990 | Crawford | .............. | B25B 21/007 408/238 |
| 5,161,772 A * | 11/1992 | DiResta | ................. | A46B 15/00 15/111 |
| 5,185,992 A | 2/1993 | Garcia | | |
| 5,495,878 A * | 3/1996 | McKenen, Jr. | .......... | B25D 1/16 144/193.1 |
| 5,511,785 A * | 4/1996 | Rusin, Jr. | ................. | A01B 1/24 172/378 |
| 5,624,328 A * | 4/1997 | Lovich | ................... | A63B 55/10 248/685 |
| 6,003,915 A * | 12/1999 | Bierman | ................... | E01H 5/02 280/823 |
| 6,128,978 A * | 10/2000 | Richey | ...................... | B25C 9/00 81/439 |
| 6,286,401 B1 * | 9/2001 | Hajianpour | ............. | B25B 13/54 81/453 |
| 6,851,254 B1 * | 2/2005 | Dalfors | ..................... | A01D 7/10 56/400.08 |
| 6,962,536 B2 * | 11/2005 | Hall | ........................ | A24F 13/12 131/241 |
| 7,562,606 B2 * | 7/2009 | Grand | .................... | B25G 1/085 483/57 |
| 7,698,882 B1 * | 4/2010 | Tinlin | ................... | A01D 51/002 294/19.2 |
| 8,074,947 B2 * | 12/2011 | Cella | ...................... | B25H 3/006 211/70.6 |
| 8,177,192 B1 * | 5/2012 | Taylor | ...................... | B25G 1/08 254/26 E |
| 8,533,890 B2 * | 9/2013 | Pannell | ................. | A47L 13/022 15/111 |
| 8,752,456 B1 * | 6/2014 | Turnbo | .................... | B25B 15/02 408/238 |
| 9,039,740 B2 * | 5/2015 | Wales | ................ | A61B 17/0401 606/232 |
| 9,277,794 B2 * | 3/2016 | Moreau | ..................... | A45B 9/00 |
| 2002/0134066 A1 * | 9/2002 | DeWinter | ................ | A01D 7/10 56/400.05 |
| 2008/0060338 A1 * | 3/2008 | Chang | ..................... | A01D 7/00 56/400.14 |
| 2012/0137548 A1 | 6/2012 | Kimball | | |
| 2015/0374081 A1 * | 12/2015 | Wang | ....................... | A45B 9/00 135/75 |

OTHER PUBLICATIONS

International Preliminary Report on Patentability for PCT/US2015/025965, dated Aug. 18, 2016, 4 pages.

\* cited by examiner

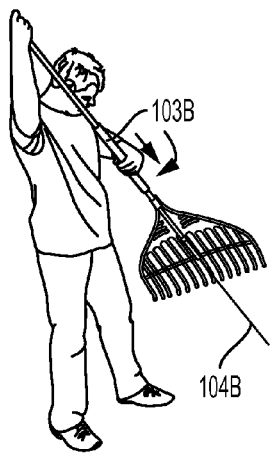
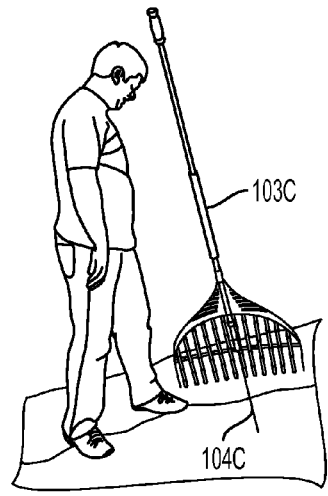
FIG. 1A　　FIG. 1B　　FIG. 1C
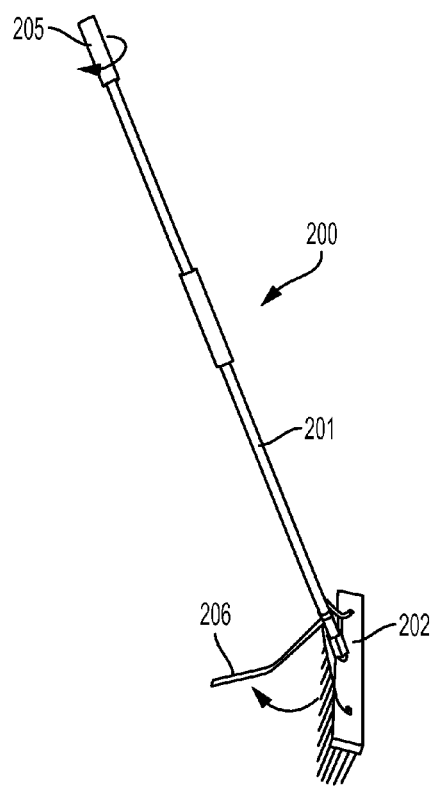
FIG. 2

HANDLE FOR A TOOL OR LIKE IMPLEMENT

CLAIM FOR PRIORITY

This application claims priority to U.S. Provisional Patent Application Ser. No. 61/981,486, filed on Apr. 18, 2014, and entitled "Ergonomic Handle that Enables a Tool to Stand Upright," the contents of which are fully incorporated by reference herein.

TECHNICAL FIELD

The application relates to handles and particularly to handles for hand operated tools and implements such as rakes, push brooms, sporting equipment and the like.

BACKGROUND

Existing tools and implements used for gardening, recreation and even light construction or landscape projects (e.g., leaf rakes, garden rakes, golf rakes, hoes, brooms, elongated paintbrush handles, or even sports implements or equipment such as a golf club) generally take an elongated form and do not contain an ability to be free standing or remain upright. Rather, such implements are either laid on the ground when not in current use or propped up against either man-made or non-manmade objects such as walls, railings, trees, shrubs, vehicles, etc.

Without a mechanism to enable the tool or implement to freely and independently stand, the user often lays the tool or implement on the ground or like surface such that the user must bend over or crouch to pick up the tool or implement for continued use. In certain scenarios, for example when performing a residential or commercial project or participating in recreational activities requiring such tools or implements, the user must often bend over multiple times to pick up the tool or implement.

BRIEF SUMMARY

In summary, one embodiment provides a tool, comprising: a handle having an interior cavity therein; a grip on the handle; a rod that is movable with respect to the interior cavity of the handle such that movements of grip are translated into movements of the rod to deploy and retract an end of the rod with respect to an end of the handle; and a tool element attached to the handle.

In an embodiment, the tool further comprises a stop element including a guide channel, the rod includes a guide element for the guide channel, and the grip overlays the stop element and is fixed with respect to the rod. In an embodiment, the guide channel is a J-shaped channel.

In an embodiment, the grip is a collar grip that slides along a length dimension of the handle, and the end of the rod deploys on an axis lying along the length of the handle to extend beyond a lateral edge of the tool element.

In an embodiment, the tool further comprises a biasing element disposed to bias the rod in a predetermined position. In an embodiment, the predetermined position is a retracted position of the end of the rod with respect to the end of the handle. In an embodiment, the biasing element is a spring positioned about the rod.

In an embodiment, the grip is a hand grip positioned near an opposite end of the handle. In an embodiment, the hand grip rotates the rod such that the end of the rod deploys and retracts in a rotational fashion with respect to the end of the handle. In an embodiment, the end of the rod that deploys and retracts is a shaped element. In an embodiment, the end of the rod deploys at an angle from an axis lying along the length of the handle.

Another embodiment provides a tool handle, comprising: a shaft having an interior cavity therein; a grip on the shaft; and a rod that is movable with respect to the interior cavity of the shaft such that movements of grip are translated into movements of the rod to deploy and retract an end of the rod with respect to an end of the shaft.

In an embodiment, the tool handle further comprises a stop element including a guide channel, the rod includes a guide element for the guide channel, and the grip overlays the stop element and is fixed with respect to the rod.

In an embodiment, the grip of the tool handle is a collar grip that slides along a length dimension of the shaft, and the end of the rod deploys on an axis lying along the length of the shaft and extends beyond a lateral edge of a tool element when affixed to the end of the shaft.

In an embodiment, the grip of the tool handle is a hand grip positioned near an opposite end of the shaft, and the hand grip rotates the rod such that the end of the rod deploys and retracts in a rotational fashion with respect to the end of the shaft.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 1(A-C) shows an example handle and free standing tool with a stake or rod.

FIG. 2 shows another example handle and free standing tool with a rod.

DETAILED DESCRIPTION

Figure 3A:
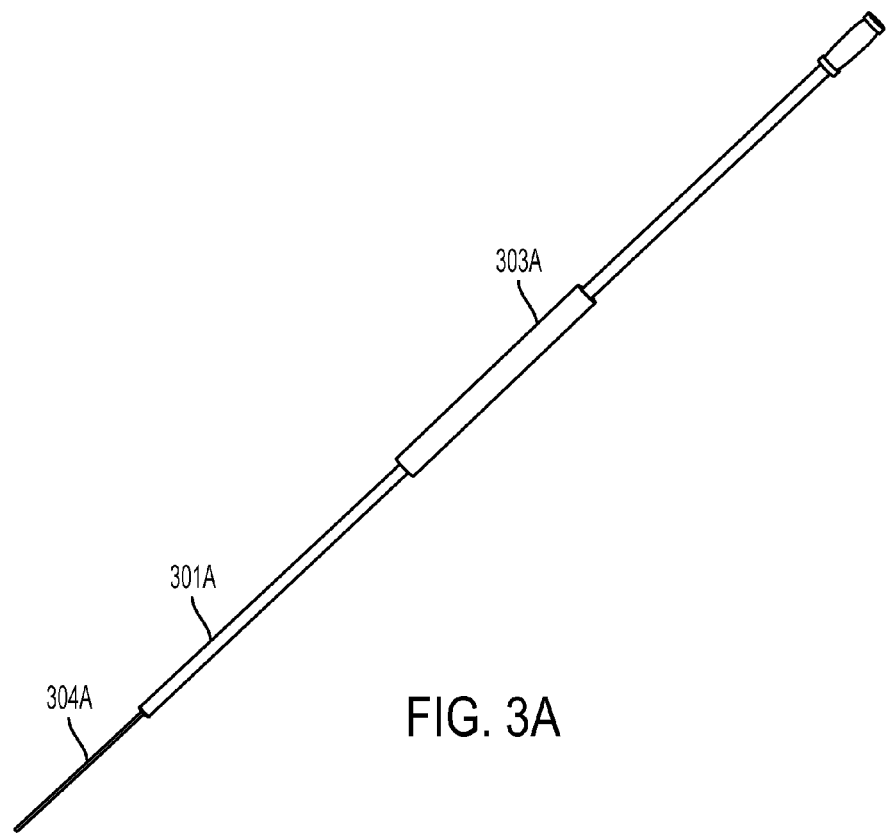
FIG. 3(A-B) illustrates an example handle according to an embodiment.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout the specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more specific details, or with other methods, components, materials, etc. In other instances, well known structures, materials, or operations are not shown or describe in detail to avoid obfuscation.

In an embodiment, an ergonomic handle is provided that deploys and retracts a stake, rod or like element. The stake, rod or like element is retractable, but may be extended or deployed, for example manually, such that when deployed the stake, rod or like element allows the tool or implement to stand upright in an independent fashion. By way of example, with the stake, rod or like element deployed from the end of the handle, a user may push the stake, rod or like element into the soft earth or other surface such that the tool or implement may stand upright independently.

In an embodiment, the handle includes an assembly of parts that permit the deployment and refraction of the stake, rod or like element from an end of the handle. The assembly or mechanism may be balanced, for example balanced based on a symmetrical balancing such that weight is evenly distributed about the handle and/or about the overall tool or implement. An embodiment thus may incorporate a symmetrically balanced and evenly weighted internal deployment and retraction mechanism that is built into the tool handle, allowing for the tool to stand in an upright position without interfering with the tool's functionality.

In an embodiment, the tool has incorporated therewith a mechanism or assembly of parts that permits the tool to stand upright independently by a stake, rod or like element that deploys at an angle with respect to the handle of the tool. In an embodiment, the stake, rod or like element is deployed by rotating, e.g., manually moving, a grip at a top end of the handle (opposite from the tool element). In this way, the stake, rod or like element deploys at an angle, where the angle may be fixed due to shaping of the stake, rod or like element, and may retain its deployed position by a stopping mechanism that secures the rod at a particular angle with respect to the handle or shaft. This allows the tool to lean against the stake, rod or like element, which is in contact with the ground. An embodiment that deploys a stake, rod or like element at an angle additionally may be used on a hard surface, such as a floor, pavement or the like, where the stake, rod or like element may not be easily pushed into the surface, because the rod in combination with the tool element creates a stand or platform that stabilizes the overall tool in an upright position.

Referring now to the figures, illustrated example embodiments will be described. The figures illustrate non-limiting, representative examples. The scope of the claimed invention is determined by the appended claim(s).

In FIG. 1(A-C) a series of views are shown illustrating an embodiment where a stake, rod or like element (hereinafter simply "rod") deploys from the end of the handle along an axis that lies along the length of handle. In other words, the rod deploys by jutting out from the end of the handle, for example jutting out past the tool element (here a leaf rake) such that when deployed the rod extends beyond the tool element.

As illustrated in FIG. 1A, the tool 100A itself is designed in an embodiment to hide or enclose the rod when not in use. That is, in the embodiment illustrated in FIG. 1A, the rod is not visible when retracted, as it lies within an interior cavity of the handle 101A. Thus, the functionality of the tool element 102A (rake) is not inhibited. However, if the user wishes to have the rake take on a free-standing mode or state, he or she may operate a control collar grip ("grip") 103A such that the rod is moved from a retracted to a deployed position.

Illustrated in FIG. 1B is a manual operation that may be performed to deploy the rod 104B. Here it may be appreciated from comparing FIG. 1A and FIG. 1B that the user may push the grip 103A down to its position as illustrated at 103B. Optionally this may include a twisting motion, as illustrated in FIG. 1B, e.g., if a J-shaped guide channel (not illustrated in FIG. 1B) is used to securely hold the rod 104B in a deployed position. This manual action acts on a mechanism that deploys the rod 104B from the end of the handle 103B where the tool element is attached. This permits the end of the rod 104B to extend beyond the tool element 102A.

As illustrated in FIG. 1C, this in turn permits the tool 100C to be pushed into the ground, whereby the rod 104C acts as a stake that may be driven into the earth such that it permits the tool 100C to be free-standing. As may be appreciated, when the user is next ready to use the tool 100A with the rod 104B retracted, the user simply picks the tool 100C up out of the ground, reverses the manual action illustrated in FIG. 1B, and retracts the rod 104B into the interior cavity of the handle 101A.

FIG. 2 illustrates another embodiment in which a rod 206 may be deployed at an angle from the handle 201 such that a tool 200 may be free standing on a hard or firm surface, i.e., one not amendable to use of a rod such as rod 104B. This embodiment may be, for example, particularly desirable as applied to push brooms or other tools or implements used on hard or firm surfaces, such as driveways, indoors, etc., or when the pushing of a stake into the ground is not desirable or is prohibited (e.g., golf course or other manicured outdoor area, finished indoor surfaces, etc.).

As illustrated in FIG. 2, while there are different mechanisms or assemblies that may be employed, an example is an opposite end grip 205 that is provided to the handle 201 at an end distant from the tool element 202, here a push broom head. Thus, the grip 205 sits at the top of the handle 201 and may be twisted or turned to rotate the rod 206 with respect to the end of the handle 201 such that the end of the rod 206 is deployed out from a retracted position, e.g., a position where it is rotated and resting atop or adjacent to the tool element 202 (retracted position not illustrated in FIG. 2). As illustrated in the example of FIG. 2, the rod 206 may be shaped, rather than straight as is rod 104B, because the rod 206 is not to be pushed into the surface or ground. Rather, rod 206 acts as a stand to prop up the tool 200 such that on a hard surface the tool 200 remains independently upright.

FIG. 3(A-B) illustrates a view of an example handle and collar grip that may be used in connection with an embodiment having a straight rod, as illustrated in FIG. 1(A-C). In FIG. 3A, the handle 301A is illustrated with a rod 304A in a deployed state and consequently the grip 303A is positioned towards the end of the handle 301A from which the rod 304A deploys and retracts. Again, this may be accomplished by mechanical action, with or without twisting or turning the grip 303A, as for example when a J-shaped channel is employed as a securing mechanism (other securing mechanisms may be utilized).

Figure 3B:
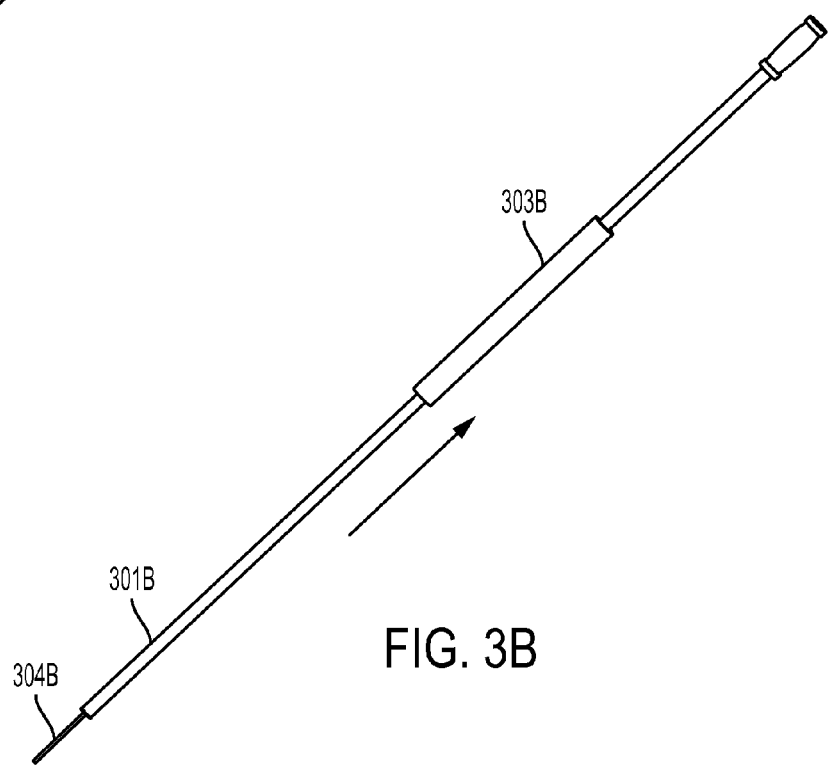

As illustrated in FIG. 3B, the handle 301B is in a retracted state, i.e., the rod 304B has been pulled into the interior cavity of the handle 301B. The rod 304B may be fully retracted or only partially retracted, as illustrated in FIG. 3B. Consequently, the grip 303B is positioned further away from the end of the handle 301B from and to which the rod deploys and retracts, respectively. As described herein, a twisting motion may be applied to the grip 303B in order to lead a guide element of the rod through a guide channel.

Figure 4A:
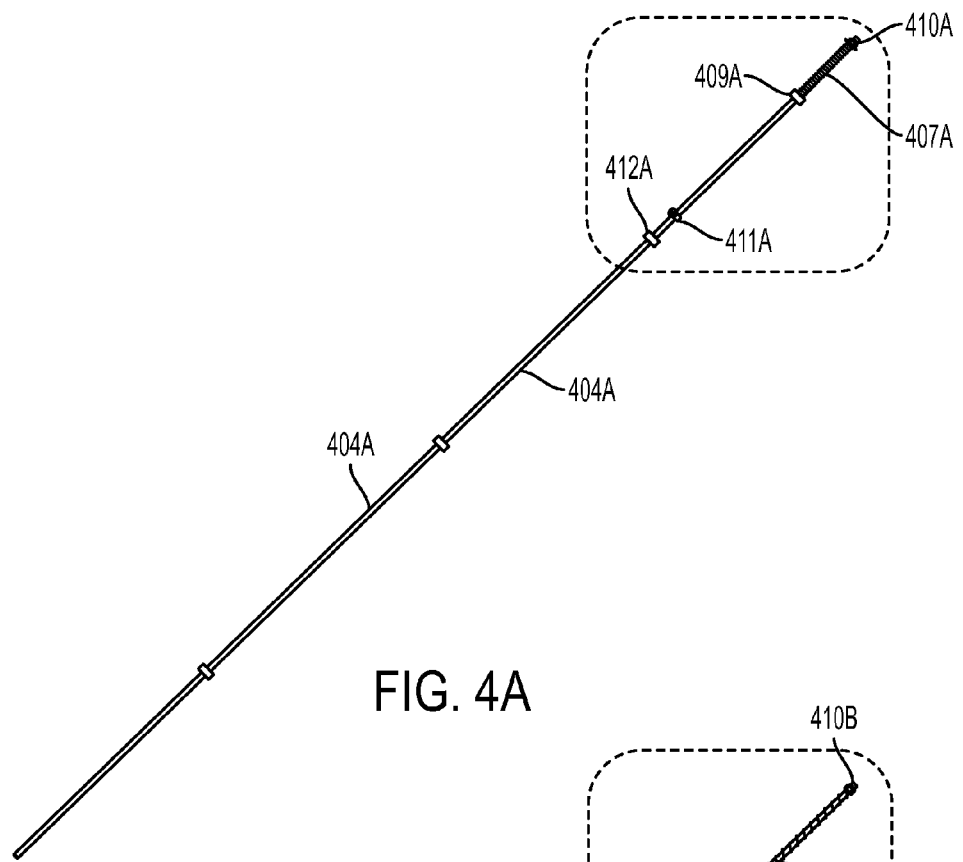
FIG. 4(A-B) illustrates an example rod according to an embodiment.

In an embodiment, a biasing mechanism may be included to assist in deploying and/or retracting the rod. For example, as illustrated in FIG. 4A, an embodiment may include a coil spring 407A or like biasing element about the rod 404A. The spring 407A may be bounded by elements, e.g., a stop bearing 409A and a nut 410A (e.g., nylon nut). This permits the spring 407A to be compressed when the rod 404A is in a deployed state (e.g., as illustrated in FIG. 3A).

Figure 4B:
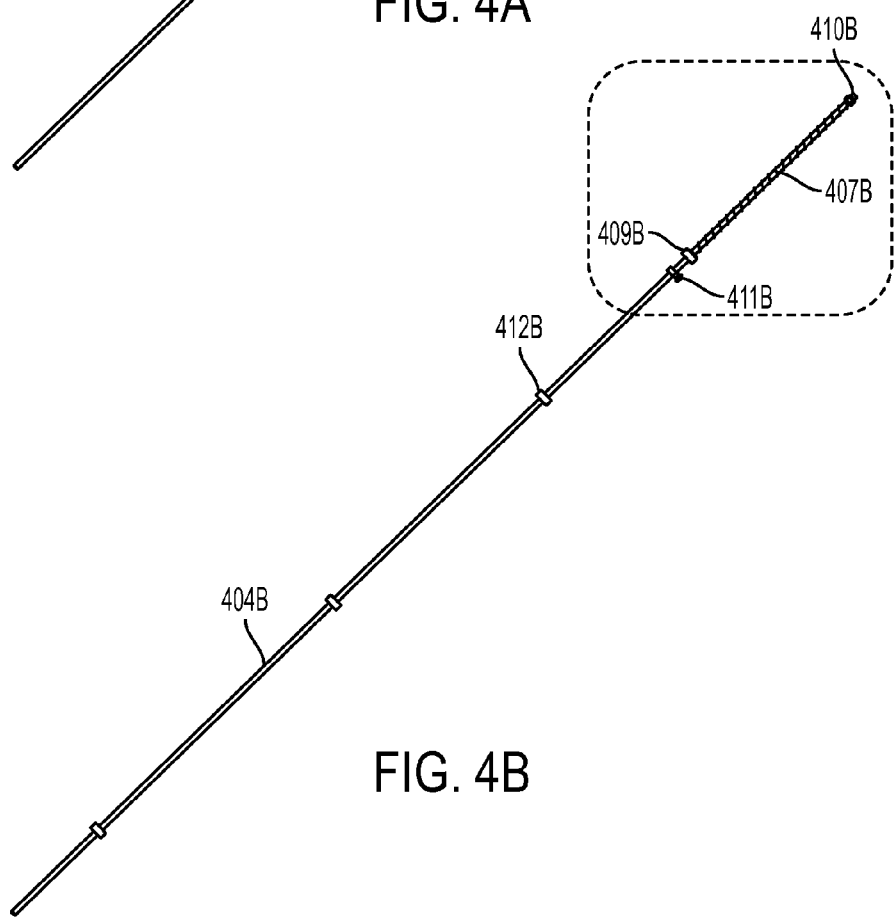

In FIG. 4B is illustrated the spring 407 in an expanded state, again bounded by elements 409B and 410B. Here, the rod 404B is in a retracted state (e.g., as illustrated in FIG. 3B). The rod (404A or 404B) is deployed and retracted, respectively, by operation of movement of the rod (404A or 404B), for example by a guide element (for example, a guide screw 411A or 411B) that is linked to or integrated with the rod (404A or 404B, respectively). The movement of the rod 404A to position of rod 404B is illustrated by way of example by movement of guide element 411A to position of guide element 411B, with reference to position of alignment element (alignment bearing) 412A, 412B, respectively, which remains stationary, as further explained in connection with FIG. 5(A-B).

Figure 5A:
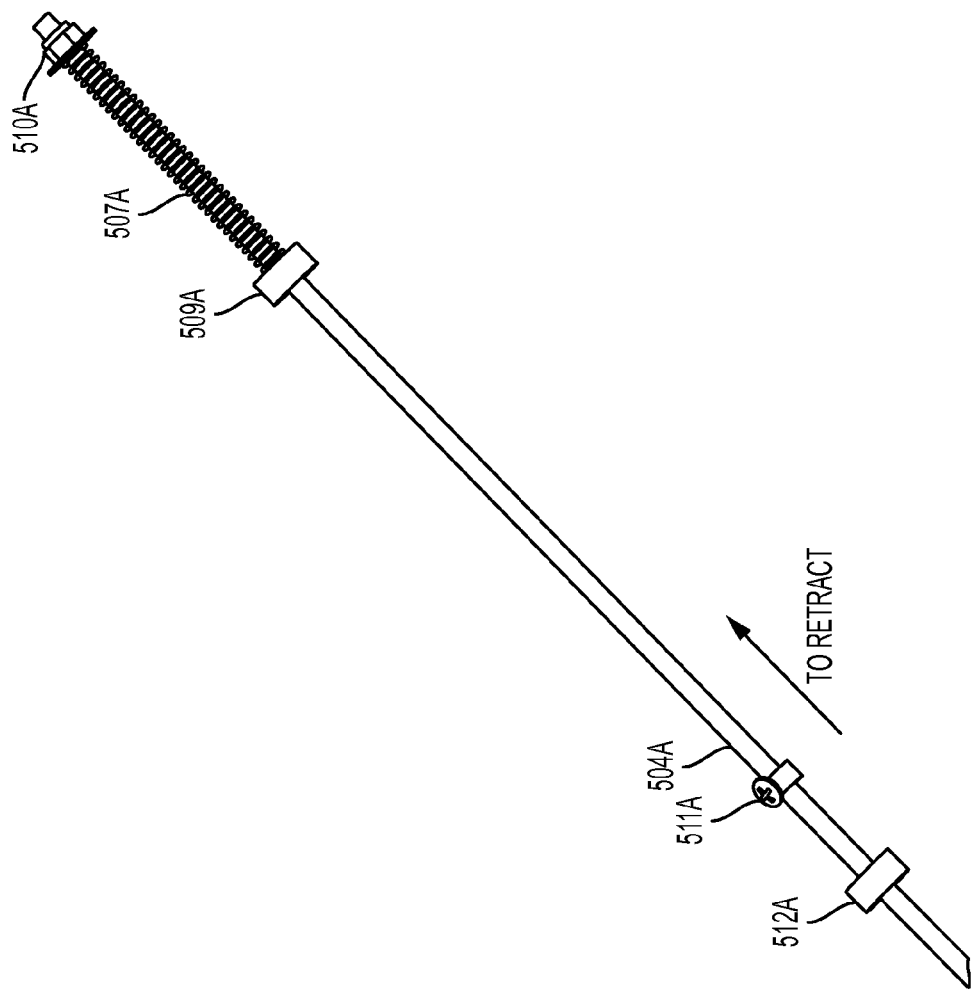
FIGS. 5A and 5B illustrate an example rod end with a biasing element corresponding to the outlined view in FIG. 4A and FIG. 4B, respectively.
Figure 5B:
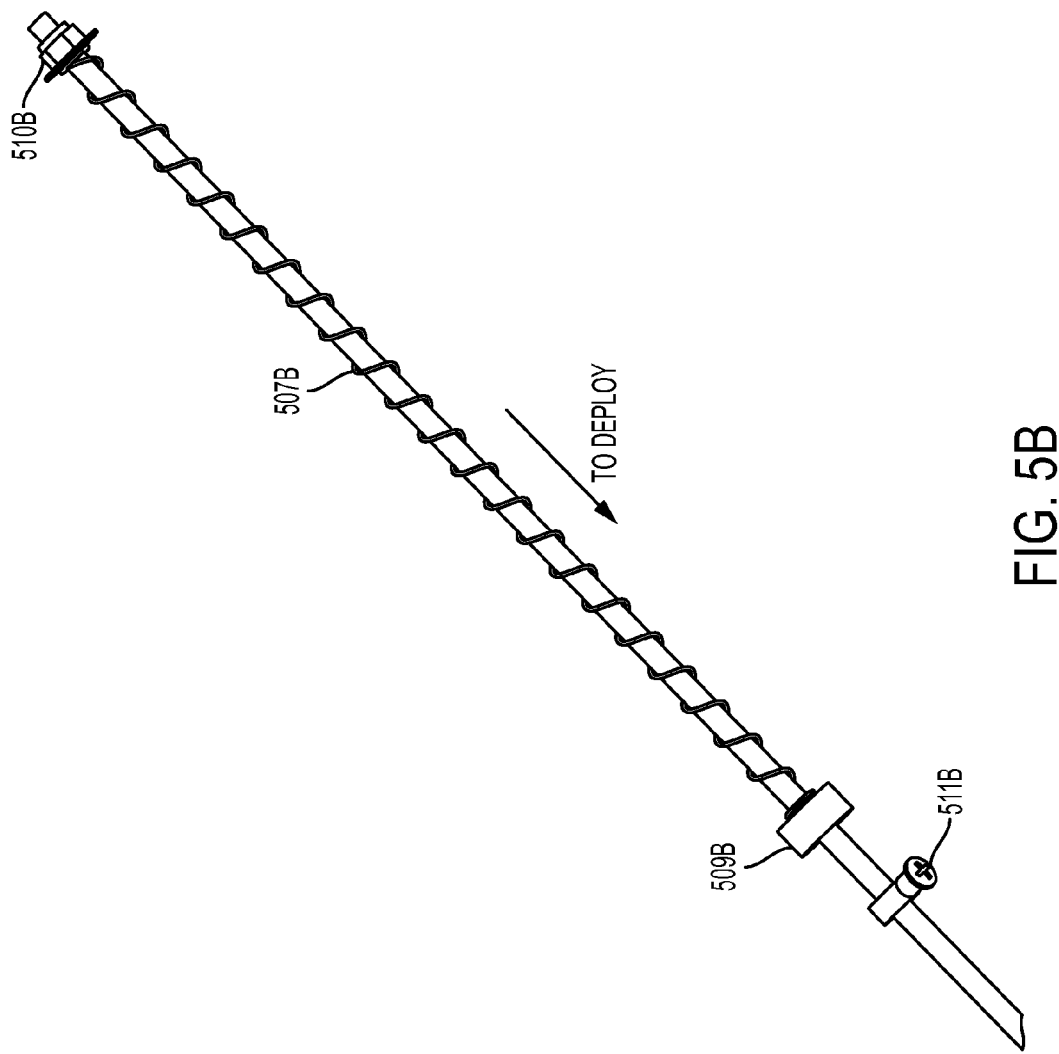

FIG. 5(A-B) for its part illustrates movement of the rod and compression/relaxation of the spring, with movement of the guide element (as in turn dictated by movement of the grip). The view shown in FIG. 5A is that of a deployed rod 504A. Here it may be appreciated that the spring 507A is bounded by elements 509A and 510A (with other elements, e.g., stop washer, which may be included). The spring 507A is compressed due to the rod 504A being moved forward, as illustrated by the position of the guide element 511A (i.e., proximate to alignment element 512A). To retract the rod 505A, and achieve a retracted state as illustrated in FIG. 5B, the rod 505A is moved (via movement of guide element by a grip such as grip 303A, 303B) such that spring 507A is no longer compressed. Thus, as illustrated in FIG. 5B, the spring 507B is relaxed by movement of the rod (element 510B has been moved away from element 509B), as illustrated by position of guide element 511B (now proximate to element 509B).

In an embodiment, the guide element travels along a guide channel such that the movement of the rod between deployed and retracted positions may be guided and secured. For example, illustrated in FIG. 6(A-B) is an example of a stop element (615A and 615B) through which the rod (604A and 604B) travels. The stop element (615A and 615B) may be secured to the handle of the tool or may be integrated into the handle of the tool itself.

Figure 6A:
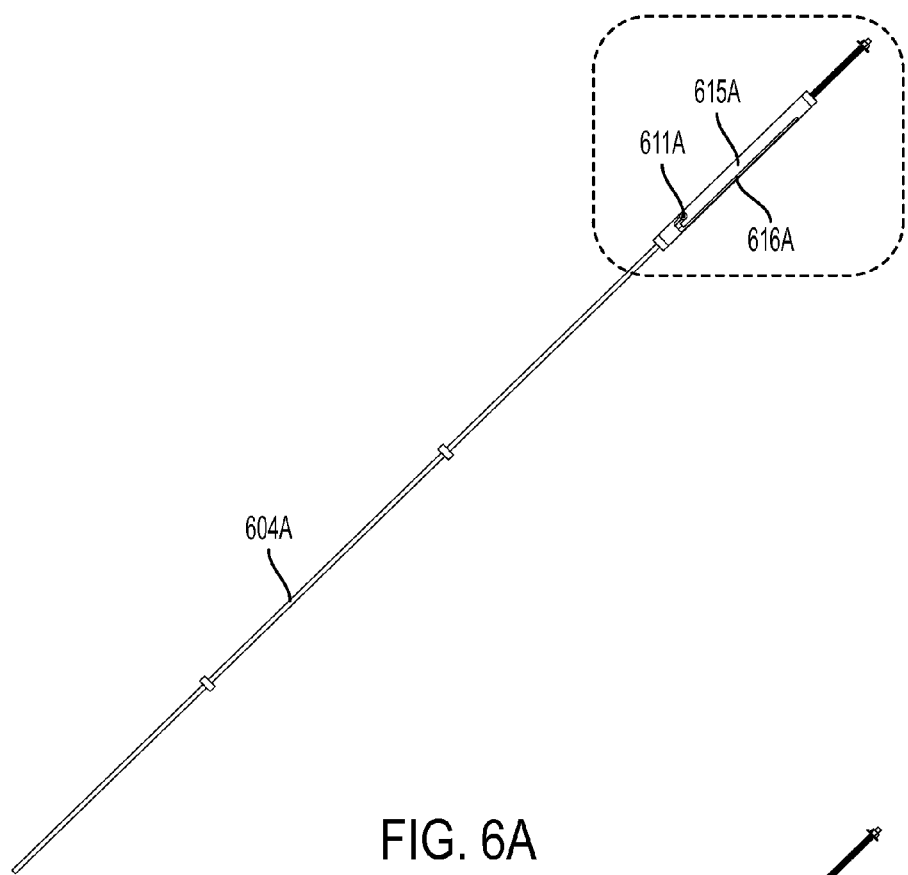
FIG. 6(A-B) illustrates an example rod with a stop element.

In FIG. 6A, the rod 604A is illustrated in a deployed position. Here it may be appreciated that a guide element 611A is in a lower part of a J-shaped guide channel 616A of the stop element 615A. This J-shaped guide channel 616A acts to retain the rod 604A in a deployed position, although the spring is compressed.

Figure 6B:
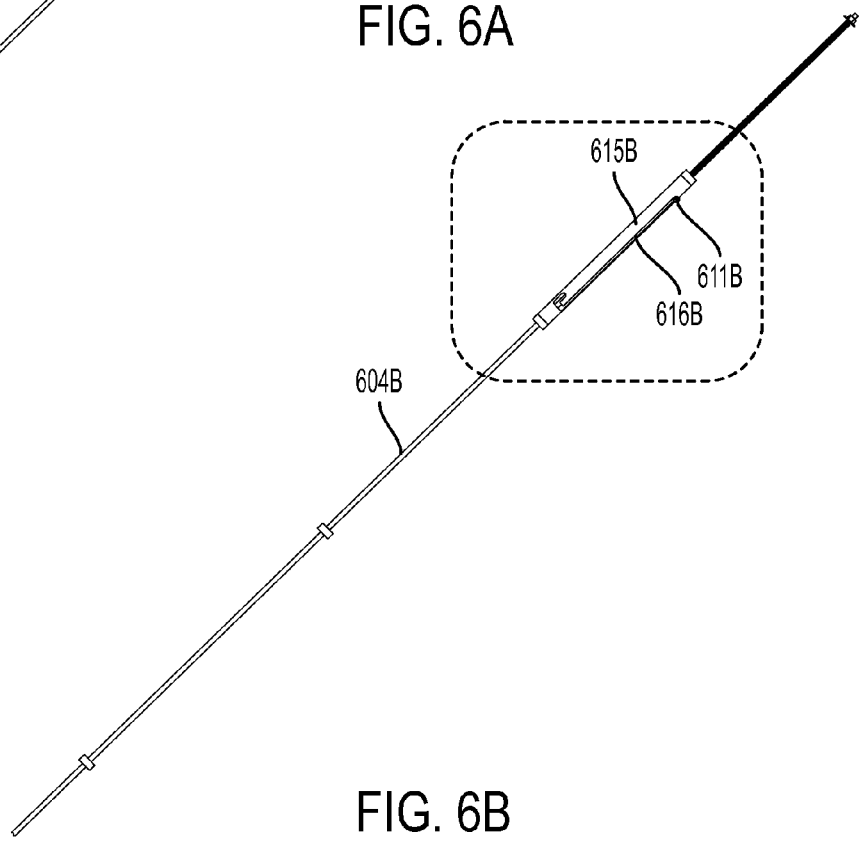

As shown in FIG. 6B, in order to transition the rod 604B into a retracted position, the guide element 611B is maneuvered along the contours of the J-shaped guide channel 616B, e.g., via manual movement of the grip (not illustrated in FIG. 6(A-B)). This permits the rod 604B to be retracted. This movement may be assisted by a biasing element, e.g., a spring as illustrated.

Figure 7A:
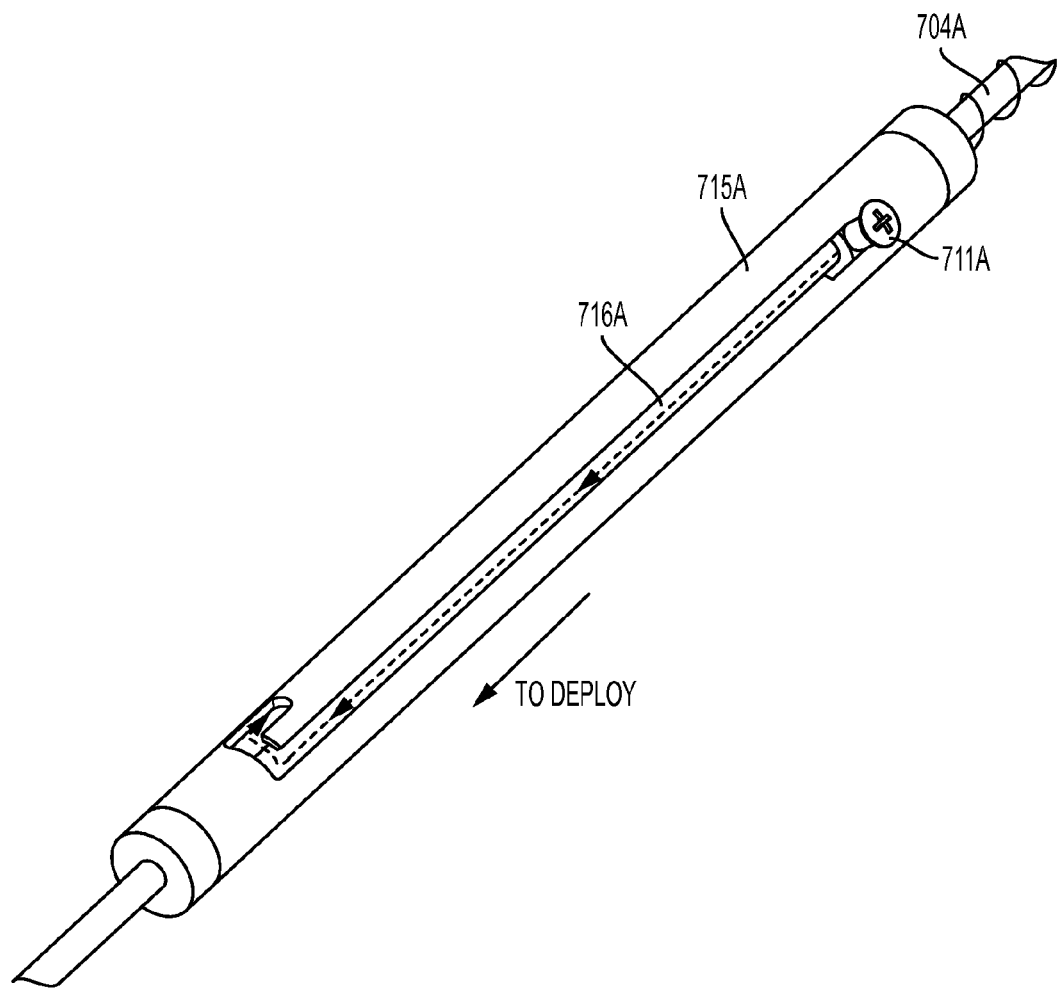
FIGS. 7A and 7B illustrate an example stop element with a guide channel corresponding to the outlined view in FIG. 6A and FIG. 6B, respectively.
Figure 7B:
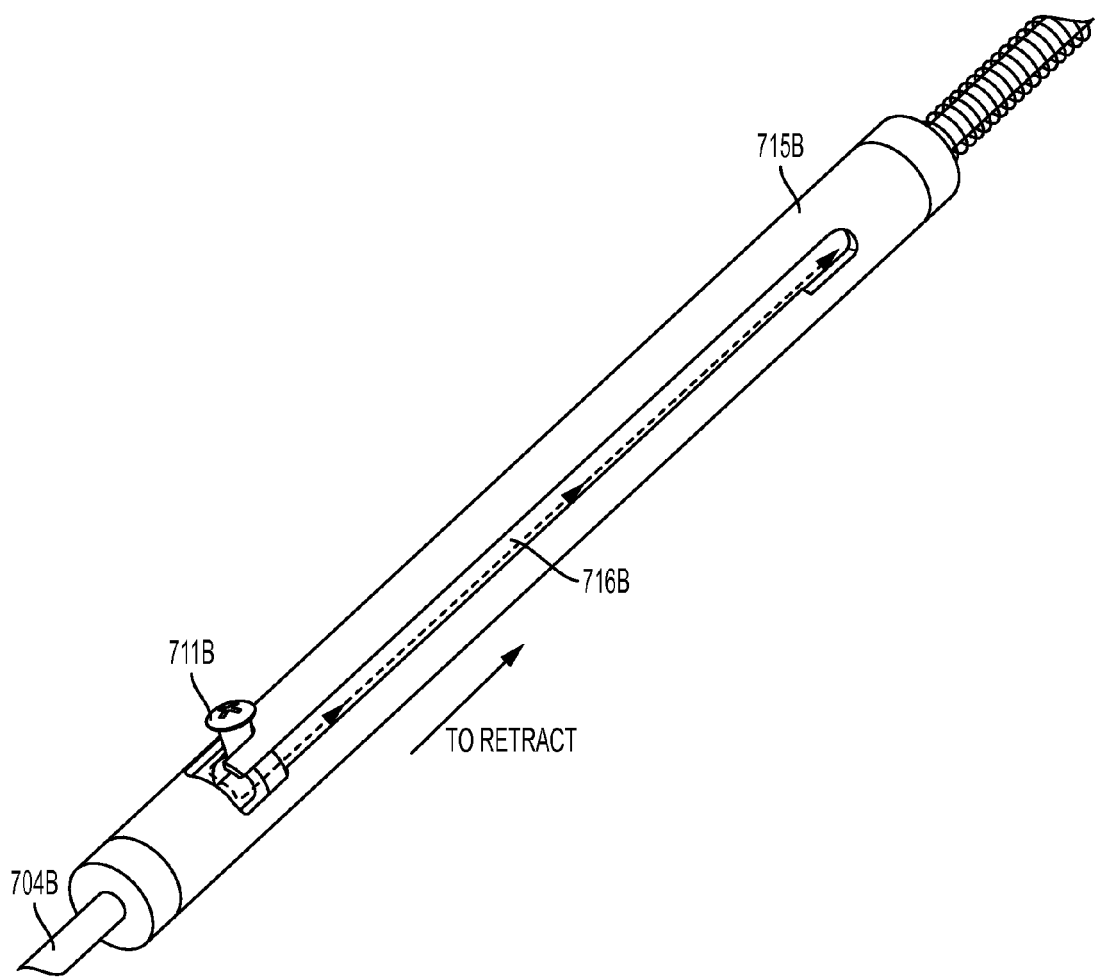

FIG. 7(A-B) illustrates enlarged views of the stop element illustrated in FIG. 6(A-B). Here it may be appreciated that the rod 704A is disposed within a stop element 715A having a guide channel 716A therein. Movement of the guide element 711A, here illustrated as a guide screw, through the guide channel 716A may be accomplished by moving the grip (not illustrated in FIG. 7(A-B)) such that the rod is transitioned from a retracted position (FIG. 7A) to a deployed position (FIG. 7B). Thus, the rod 704B may be deployed (FIG. 7B) by moving the guide element 711B via grip (not illustrated in FIG. 7B) through the guide channel 716B of the stop element 715B such that it transitions the rod 704B to a deployed position.

As described herein, an embodiment may include the guide channel with the handle such that the handle itself acts as the stop element. In other words, the stop element may be integrally included in the handle as a portion of the handle. Likewise, an independent (separate part) may be used as a stop element, and used in connection with an independent (separate part) handle.

Figure 8A:
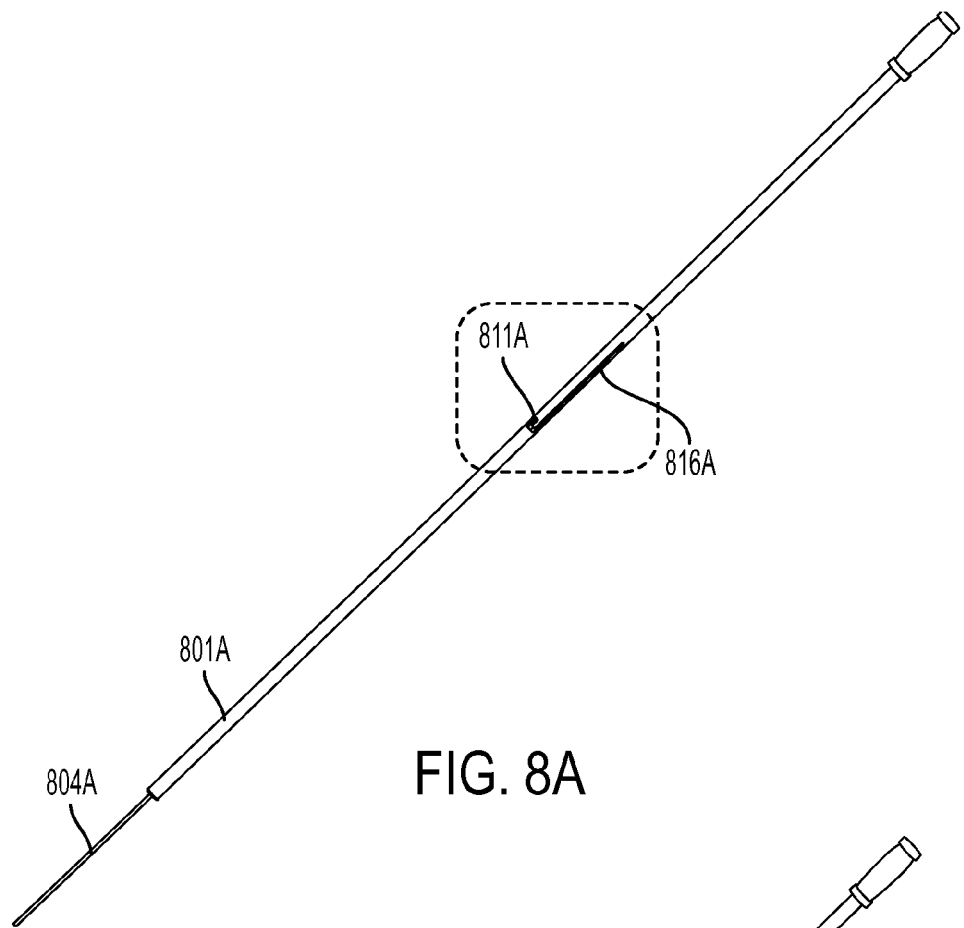
FIG. 8(A-B) illustrates an example handle having a guide channel.
Figure 8B:
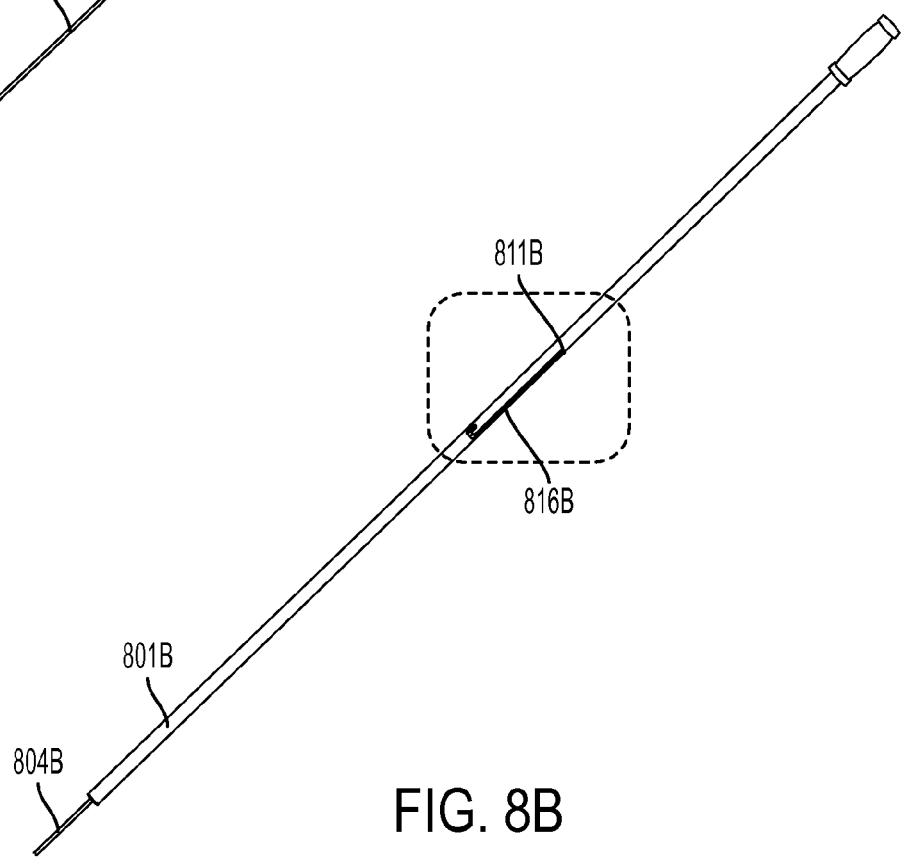

An example of a handle having a guide channel therein is provided in FIG. 8(A-B). In FIG. 8A it is illustrated that the rod 804A may be deployed by moving the guide element 811A of the rod 804A down the guide channel 816A provided in the handle 811A. Likewise, as illustrated in FIG. 8B, the rod 804B may be retracted by moving the guide element 811B via the guide channel 816B provided in the handle 801B to a back position.

Accordingly, the various embodiments include an ergonomic handle having a stake, rod or like element that deploys and retracts, e.g., with a control collar grip, an end grip, or a combination of the foregoing. The stake, rod or like element may be deployed and retracted by manually moving the control collar grip, by rotating the end grip, or a combination of the foregoing.

In an embodiment, as will be appreciated by those having ordinary skill in the art, the construction details of an embodiment are that the ergonomic handle and inner assembly may be made from aluminum or of any other sufficiently rigid and strong material such as high-strength plastic, metal, composites and the like. Further, the various components of the handle and inner assembly may be made of different materials. Particularly, the stake, rod or like element may be formed of a rigid steel or plastic, e.g., when it is in a stake form to be pushed into the ground, or may be formed of semi-rigid material such that it may be deployed at an angle from an originally straight position. Likewise, if a rotating rod is utilized, such a stake, rod or like element may be formed of rigid material and shaped to a suitable form such that it rotates outwardly from the tool element to form a stand and rotates inwardly towards the tool element to rest against the tool element.

A user thus may stand upright, naturally holding the tool in the operating position to deploy and retract a tool stand mechanism in one quick, fluid motion. The internal mechanism in conjunction with the handle forms a modular design for multiple applications, e.g., leaf rakes, garden rakes, golf rakes, hoes, brooms, elongated paintbrush handles, golf clubs, etc. In an embodiment, a mechanism may be provided inside the handle so the casual observer may not notice the difference between a handle incorporating the mechanism and one that does not. In an embodiment, an ergonomic handle mechanism deploys and retracts a stake, rod or like element enabling a tool or implement to which it is attached to stand upright.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A tool, comprising:
   a handle having an interior cavity therein;
   a cylindrical grip disposed on the handle at a middle position and mechanically coupled to a rod, wherein the cylindrical grip moves laterally on the handle;
   the rod being disposed within the interior cavity of the handle, wherein the rod is movable with respect to the interior cavity of the handle by movements of the cylindrical grip translated into movements of the rod to deploy and retract a first end of the rod with respect to an end of the handle that is fixed to a tool element;
   the rod comprising a substantially uniform rod having a element disposed thereon and located proximate to a second end of the rod; and
   a spring positioned about the rod and secured in place by the element, the spring extending between the element and the second end of the rod;
   the tool element being attached to the end of the handle in a fixed position, wherein the tool element is not attached to the cylindrical grip or the rod;
   wherein the tool is configured to deploy the rod by moving the cylindrical grip along the handle and towards the tool element, compressing the spring against the element;
   whereby the first end of the rod extends beyond the end of the tool element to allow the rod be pushed into the earth to secure the tool in an upright position.

2. The tool of claim 1, further comprising:
   a stop element including a guide channel;
   wherein the rod includes a guide element for the guide channel; and
   wherein the cylindrical grip overlays the stop element and is fixed with respect to the rod.

3. The tool of claim 2, wherein the cylindrical grip is a collar grip that slides along a length dimension of the handle, and wherein the first end of the rod deploys on an axis lying along the length of the handle and extends beyond a lateral edge of the tool element.

4. The tool of claim 3, wherein the spring is disposed to bias the rod in a predetermined position.

5. The tool of claim 4, wherein the predetermined position is a retracted position of the first end of the rod with respect to the end of the handle.

6. The tool of claim 3, wherein the guide channel is a J-shaped channel.

7. A tool, comprising:
   a handle having an interior cavity therein;
   a cylindrical grip disposed on the handle at a middle position and mechanically coupled to a rod, wherein the cylindrical grip moves laterally on the handle;
   the rod being disposed within the interior cavity of the handle, wherein the rod is movable with respect to the interior cavity of the handle by movement of the cylindrical grip translated into movements of the rod to deploy and retract a first end of the rod with respect to an end of the handle that is fixed to a rake head;
   the rod comprising a substantially uniform rod having an element disposed thereon and located proximate to a second end of the rod; and
   a spring positioned about the rod and secured in place by the element, the spring extending between the element and the second end of the rod;
   the rake head being attached to the end of the handle in a fixed position,
   wherein the rake head is not attached to the cylindrical grip or the rod;
   the rake head comprising a plurality of rigid tines;
   wherein the tool is configured to deploy the rod by moving the cylindrical grip along the handle and towards the rake head, compressing the spring against the element;
   whereby the first end of the rod extends beyond the end of the plurality of the rigid tines to allow the rod be pushed into the earth to secure the tool in an upright position.

* * * * *